United States Patent
Krishnan et al.

(10) Patent No.: US 11,165,684 B2
(45) Date of Patent: Nov. 2, 2021

(54) ROUTE CONSISTENCY CHECKER FOR NETWORK DEVICES

(71) Applicant: Juniper Networks, Inc., Sunnyvale, CA (US)

(72) Inventors: Vasudevan Navaneetha Krishnan, Bangalore (IN); Raveendra Torvi, Nashua, NH (US); Srikanth Venakta Gandiboyina, Bangalore (IN); Ashish Kumar, Bangalore (IN); Srihari Ramachandra Sangli, Bangalore (IN); Jimmy Jose, Hosur (IN); Amit Arora, Bangalore (IN); Harmeet Singh, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/835,970

(22) Filed: Mar. 31, 2020

(65) Prior Publication Data
US 2021/0306249 A1   Sep. 30, 2021

(51) Int. Cl.
*H04L 12/66*   (2006.01)
*H04L 12/755*  (2013.01)
*H04L 12/721*  (2013.01)
*H04L 12/46*   (2006.01)

(52) U.S. Cl.
CPC .......... *H04L 45/021* (2013.01); *H04L 12/66* (2013.01); *H04L 12/46* (2013.01); *H04L 45/14* (2013.01)

(58) Field of Classification Search
CPC ....... H04L 45/021; H04L 12/56; H04L 12/26; H04L 45/16; H04L 45/70; H04L 63/10
See application file for complete search history.

(56) References Cited

U.S. PATENT DOCUMENTS

| | | | | |
|---|---|---|---|---|
| 7,440,394 | B2* | 10/2008 | Ohenoja | H04L 45/00 370/216 |
| 8,369,345 | B1* | 2/2013 | Raghunathan | H04L 49/40 370/397 |
| 9,660,866 | B1* | 5/2017 | Singh | H04L 41/0816 |
| 10,505,847 | B1* | 12/2019 | Singarayan | H04L 61/6022 |

(Continued)

OTHER PUBLICATIONS

Extended Search Report from counterpart European Application No. 20180222.0, dated Feb. 22, 2021, 6 pp.

*Primary Examiner* — Abdelnabi O Musa
(74) *Attorney, Agent, or Firm* — Shumaker & Sieffert, P.A.

(57) ABSTRACT

In general, this disclosure describes a network device that checks consistency between routing objects in a routing information base (RIB), a forwarding information base (FIB), and packet forwarding engine (PFE) forwarding tables. A method includes generating a marker that causes a routing protocol daemon, a control plane kernel, and PFEs of a network device to calculate zonal checksums for a plurality of zones using consistency values for each routing object within a RIB, a FIB, and corresponding forwarding tables respectively. The method includes performing a consistency check on the RIB, the FIB, and the forwarding tables to determine whether the routing objects in each of the RIB, the FIB, and the forwarding tables are consistent with each other. The method includes, when the RIB, the FIB, and the forwarding tables are not consistent, performing an action related to at least one of RIB, the FIB, or the forwarding tables.

18 Claims, 10 Drawing Sheets

(56) References Cited

U.S. PATENT DOCUMENTS

| | | | |
|---|---|---|---|
| 2007/0022479 A1* | 1/2007 | Sikdar | H04L 63/0218 |
| | | | 726/22 |
| 2010/0043067 A1* | 2/2010 | Varadhan | H04L 45/16 |
| | | | 726/13 |
| 2016/0352865 A1* | 12/2016 | Gupta | H04L 67/42 |
| 2017/0134268 A1* | 5/2017 | Easale | H04L 47/20 |
| 2018/0239667 A1 | 8/2018 | Chen | |
| 2018/0367405 A1 | 12/2018 | Harneja et al. | |
| 2020/0021522 A1* | 1/2020 | Singarayan | H04L 49/25 |

* cited by examiner

ROUTE CONSISTENCY CHECKER FOR NETWORK DEVICES

TECHNICAL FIELD

The disclosure relates to packet-based computer networks and, more particularly, to forwarding packets within computer networks.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a control unit that provides control plane functionality for the network device and forwarding components for routing or switching data units. In some cases, for example, a network device may include a plurality of packet forwarding engines (PFEs) and a switch fabric that collectively provide a forwarding plane for forwarding network traffic.

The control plane functions provided by the control unit include storing network topologies in the form of a routing information base (RIB), executing routing protocols to communicate with peer routing devices to maintain and update the RIB, and providing a management interface to allow user access and configuration of the network device. The control unit maintains routing information that represents the overall topology of the network and defines routes to destination prefixes within the network.

The control unit derives a forwarding information base (FIB) that includes a number of forwarding entries generated by the control unit in accordance with the routing information and control information. The control unit installs the forwarding structures within the data plane to programmatically configure the forwarding components. The data and instructions that constitute the forwarding entries define an internal forwarding path for each incoming packet received by the network device. For example, to generate a route table lookup forwarding entry, the control unit selects routes defined by the network topology and maps packet key information (e.g., destination information and other select information from a packet header) to one or more specific next hop network devices and ultimately to one or more specific output interfaces of interface cards of the network device. In some cases, the control unit may install the forwarding structures into each of the PFEs to update the forwarding table within each of the PFEs and control traffic forwarding within the data plane. Bifurcating control and data plane functionality allows the forwarding table in each of PFEs to be updated without degrading packet forwarding performance of the network device.

SUMMARY

In general, the disclosure describes techniques that enable checking consistency between routing and forwarding tables in a network device. From time-to-time, a control plane of a network device may change network routes in a routing information base (RIB) to reflect, for example, a change in network technology. These changes are then communicated to the forwarding information base (FIB) as forwarding entries. The FIB is used to propagate the changes to forwarding tables within packet forwarding engines (PFE) so that all the PFEs have identical forwarding tables. In response to these changes, the control plane performs consistency checks to ensure that the FIB and the forwarding tables reflect the routes as defined by the RIB. To do this, the entries in the RIB, FIB, and forwarding tables are each further sub-categorized into zones. Each entry in each of the databases or tables is associated with consistency values (e.g., a zone identifier, a checksum, a timestamp, etc.). The control plane checks the consistency of the RIB, FIB and PFEs based on zonal checksum calculations using the consistency values. When all the zonal checksums on the RIB, FIB and the PFEs match expected values, the control plane determines that the FIB and forwarding tables in the network device are consistent and that no further actions need to be taken. When one or more of the zonal checksums do not match the corresponding expected values, the control plane determines an inconsistency between one or more of the databases or tables. The control plane may then provide an alert indicative of inconsistency in a routing object (e.g., a prefix, nexthops or a set of prefixes/nexthops).

An example method includes generating, by a routing protocol daemon (RPD) operating on a control plane, a marker that causes the RPD, a control plane kernel, and packet forwarding engines of a network device to calculate zonal checksums for a plurality of zones based on consistency values for each routing object within a routing information base (RIB), a forwarding information base (FIB), and corresponding forwarding tables respectively. The routing objects each being assigned to one of the plurality of zones. The method also includes performing, by a collector daemon, a consistency check on the RIB, the FIB, and the forwarding tables to determine whether the routing objects in each of the RIB, the FIB, and the forwarding tables are consistent with each other. Additionally, the method includes, when the RIB, the FIB, and the forwarding tables are not consistent with each other, performing an action related to at least one of RIB, the FIB, or the forwarding tables.

An example network device includes a control unit and a plurality of packet forwarding engines. The control unit includes a kernel, operates a routing protocol daemon (RPD), and is communicatively coupled to a collector daemon. The control plane also stores a routing information base (RIB) and an associated first consistency table and a forwarding information base (FIB) and an associated second consistency table. Each packet forwarding engine stores a forwarding table and an associated third consistency table. In response to the RPD generating a marker, the RPD, a control plane kernel, and packet forwarding engines each calculate zonal checksums for a plurality of zones based on consistency values stored in the consistency tables for each routing object within the RIB, the FIB, and the forwarding tables respectively. The routing objects are each assigned to one of the plurality of zones. The collector daemon performs a consistency check on the RIB, the FIB, and the forwarding tables to determine whether the routing objects in each of the RIB, the FIB, and the forwarding tables are consistent with each other. When the RIB, the FIB, and the forwarding tables are not consistent with each other, the collector daemon performs an action related to at least one of RIB, the FIB, or the forwarding tables.

An example computer readable medium comprises instruction that, when executed, cause a network device to generate, by a routing protocol daemon (RPD), a marker that causes the RPD, a control plane kernel, and packet forwarding engines of a network device to calculate zonal checksums for a plurality of zones based on consistency values for each routing object within a routing information base (RIB), a forwarding information base (FIB), and corresponding forwarding tables respectively. The routing objects are each assigned to one of the plurality of zones. Additionally, the instruction, when executed, cause the network device to perform, by a collector daemon, a consistency check on the RIB, the FIB, and the forwarding tables to determine whether the routing objects in each of the RIB, the FIB, and the forwarding tables are consistent with each other, and when the RIB, the FIB, and the forwarding tables are not consistent with each other, perform an action related to at least one of RIB, the FIB, or the forwarding tables.

The details of one or more examples are set forth in the accompanying drawings and the description below. Other features, objects, and advantages will be apparent from the description and drawings, and from the claims.

DETAILED DESCRIPTION

Figure 1:
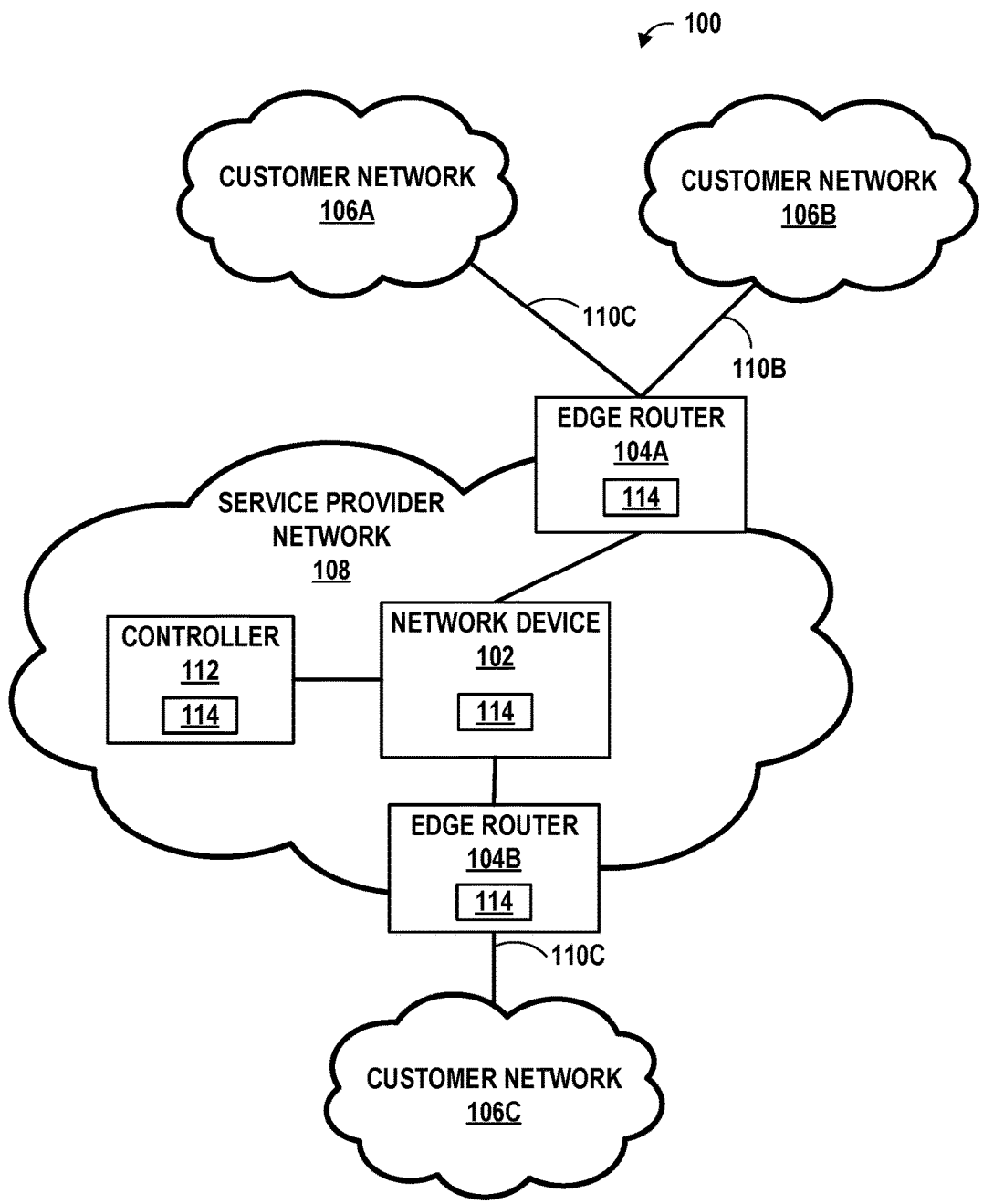
FIG. 1 illustrates a system with network devices operating in accordance with the principles described in this disclosure.

From time-to-time, a control plane of a network device may change network routes in a routing information base (RIB) to reflect, for example, a change in network topology. These changes are then communicated to the forwarding information base (FIB) as forwarding entries. The FIB is used to propagate the changes to forwarding tables of packet forwarding engines (PFE) so that all the PFEs have identical forwarding tables. However, an error may cause one or more of the PFEs not to properly update its forwarding table such that entries in the forwarding modules may not match the entries as set forth in the FIB or RIB of the control plane. As discussed below, a daemon (sometimes referred to as a "collector daemon") determines whether the entries in the forwarding tables of the PFEs and the FIB are consistent with the entries specified by the RIB. The collector daemon may be executing on the control plane. Alternatively, in some examples, the collector daemon may be executing on a separate device, such as controller device operating in the network. Initially, the entries in each of the database or tables are further sub-categorized into zones such that each entry is associated with a zone identifier (ID). These zone assignments are communicated to the RPD (for the RIB), the kernel (for the FIB), and the PFEs. Additionally, when a routing entry is communicated to the kernel, the kernel associates the routing entry with a timestamp. The timestamp is then communicated to the RPD and the PFEs. Additionally, RPD calculates an individual checksum for the new routing entry. The timestamp is communicated to the RPD and the PFEs to be stored in association with the corresponding routing entry. As part of processing the new routing entry and associated timestamp, the kernel and the PFEs calculate the individual checksum using the same checksum algorithm as the RPD. In some examples, the RIB and the FIB are each associated with a consistency table. The PFEs include both forwarding tables that store the routing entries (sometimes referred to as "routing objects") and consistency tables that store the zone assignment, timestamp, and individual checksum in association with the corresponding entry in the forwarding table.

From time-to-time, the control plane generates a marker that initiates a consistency check (e.g., via a routing protocol daemon (RPD)). The marker includes a timestamp generated by the kernel. The marker is communicated to the kernel and each of the PFEs. The marker is installed in the kernel (for the FIB) and the PFEs (for the forwarding tables). The kernel and the PFEs send acknowledgement messages once the marker is installed. In response to receiving an acknowledgement message from the kernel and the PFEs, RPD generates a compute message to cause each of the kernel and the PFEs to calculate checksums for each zone based on the entries on their respective routing tables assigned to the zone (e.g., as a background process). Additionally, the compute message triggers the RPD (for the RIB) to calculate checksums for each zone. In some examples, the zone checksum is based on the individual checksums of the entries included in the zone. In some examples, the entries associated with a timestamp before the marker timestamp are included in the zone checksum calculations. The RPD, kernel, and the PFEs report the zonal checksums and zone-based entry counts that include a number of entries in the forwarding table in that zone (sometimes collectively referred to as "consistency information") to the collector daemon. The collector daemon initially filters the received consistency information based on the zone-based entry counts. When a zone-based entry count does not match, the collector daemon determines there is an inconsistency between the forwarding tables of the RIB, the FIB, and the PFEs. The collector daemon then compares the zonal checksums with expected checksums. When one of the zonal checksums does not match the expected checksums, the collector daemon determines there is an inconsistency between the forwarding tables of the RIB, the FIB and the PFEs. Determining that there is an inconsistency in at least one of the forwarding tables causes the collector daemon to send a non-acknowledgement message to the RPD. In some examples, the non-acknowledgement message causes the RPD to reissue the compute message to trigger the RPD (for the RIB), the kernel (for the FIB) and the PFEs to repeat the consistency check. For example, inconsistency may be caused by a PFE that is slower to process an updated forwarding table. In such an example, repeating the consistency check may allow the slower PFE to process the update such that the repeated consistency check will not result in an inconsistency. The collector daemon may repeat the consistency check due to an inconsistency a threshold number of times in a row.

After a threshold number of failed consistency checks, the PRD may set a brute force flag in the marker. Subsequently, the RPD reissues the compute message. When the brute force flag is set, the compute message causes the RPD, kernel, and PFEs to send the consistency information as well as the individual checksums and/or individual entries in the respective databases or tables to the collector daemon. Using this information, the collector daemon determines which specific entries are mismatched. In some examples, the collector daemon may set the brute force flags a predetermined amount of times to eliminate false positives (e.g., only considering an entry to be mismatched if identified as a mismatch in a threshold number of brute force attempts, etc.). In some examples, the control plane, through a daemon, may provide a graphical interface to indicate the inconsistency between the RIB and the FIB and/or PFEs.

FIG. 1 is a block diagram illustrating an example network environment in which a service provider network includes a network device configured in accordance with techniques described in this disclosure. For purposes of example, the principles of the invention are described with respect to a simplified network environment 100 of FIG. 1 in which a network device 102 (sometimes referred to as a "core router") communicates with edge routers 104A and 104B (collectively "edge routers 104") to provide customer networks 106A-106C (collectively "customer networks 106") with access to service provider network 108. The router 102 may exchange routing information with the edge routers 104 and/or controller 112 in order to maintain an accurate representation of the topology of the network environment 100. As described below, the network device 102 may consist of a plurality of cooperative routing components operating as a single node within the service provider network 108. The network device 102 includes a chassis (not shown in FIG. 1) that couples various internal routing components (e.g., line cards, switching fabric cards, a routing engine card, etc.) together.

Although not illustrated, the service provider network 108 may be coupled to one or more networks administered by other providers, and may thus form part of a large-scale public network infrastructure, e.g., the Internet. Consequently, the customer networks 106 may be viewed as edge networks of the Internet. The service provider network 108 may provide computing devices within the customer networks 106 with access to the Internet, and may allow the computing devices within the customer networks 106 to communicate with each other. In another example, the service provider network 108 may provide network services within the core of the Internet. In either case, the service provider network 108 may include a variety of network devices (not shown) other than the router 102 and the edge routers 104, such as additional routers, switches, servers, or other devices.

In the illustrated example, the edge router 104A is coupled to the customer network 106A via access link 110A, and the edge router 104B is coupled to the customer networks 106B and 106C via additional access links 110B and 110C. The customer networks 106 may be networks for geographically separated sites of an enterprise. The customer networks 106 may include one or more computing devices (not shown), such as personal computers, laptop computers, handheld computers, workstations, servers, switches, printers, customer data centers or other devices. The configuration of the network environment 100 illustrated in FIG. 1 is merely an example. The service provider network 108 may be coupled to any number of the customer networks 106. Nonetheless, for ease of description, only an example number of customer networks 106A-106C are illustrated in FIG. 1. Many different types of networks besides service provider networks 108 may employ an instance of the router 102, including customer/enterprise networks, transport networks, aggregation or access networks, and so forth. Network traffic may flow, for example, from one customer network 106A to another customer network 106C through network device 102.

In the illustrated example, service provider network 108 includes a controller 112. In some examples, controller 112 may comprises software-defined networking controller. Controller 112 may monitor service provider network 108 and provide an interface for administrators to configure and/or monitor devices within service provider network 108 (e.g., network device 102, edge routers 104, etc.). In some examples, controller 112 may perform diagnostic functions and display health of service provider network 108 in a graphical user interface to facilitate maintenance of service provider network 108. In other examples, controller 112 may advertise the topology of service provider network 108 and/or perform path computation based on the topology of service provider network 108 and advertise routing updates to the devices within service provider network 108.

In the illustrated example, network device 102 and/or edge routers 104 includes a collector daemon 114 that monitor a consistency of a RIB, a FIB, and multiple forwarding tables within network device 102 as described below. Collector daemon 114, in conjunction with an RPD of network device 102, initiates a consistency check to determine whether a RIB, a FIB, and multiple forwarding tables within network device 102 are consistent. The RIB, the FIB, and the forwarding tables are consistent when each database and/or table includes the same routing entries. As described below, collector daemon 114 receives consistency information from the RDP, the kernel, and the PFEs of network device 102. Collector daemon 114 is aware of PFEs in the network device 102 such that collector daemon 114 can track when it has received responses from all of the PFEs. Based on the consistency information, collector daemon 114 reports to the RPD whether the RIB, the FIB, and the forwarding tables are consistent. When RIB, the FIB, and the forwarding tables stay inconsistent (e.g., after a threshold number of consistency checks), collector daemon 114 may walk through the routing entries of the RIB, the FIB, and the forwarding tables to determine which routing entries are inconsistent (sometimes referred to as a "brute force" consistency check). In some examples, results of the brute force consistency check are provided to the RPD and/or controller 112 (e.g., to be graphically display to an administrator, etc.). While, in connection to FIGS. 2-10 below, collector daemon 114 is described as executing on network device 102, the collector daemon 114 is executed by edge routers 104 and, in some examples, collector daemon 114 is executed by controller 112 that is communicatively coupled to the RPD, the kernel, and the PFEs of network device 102.

Figure 2:
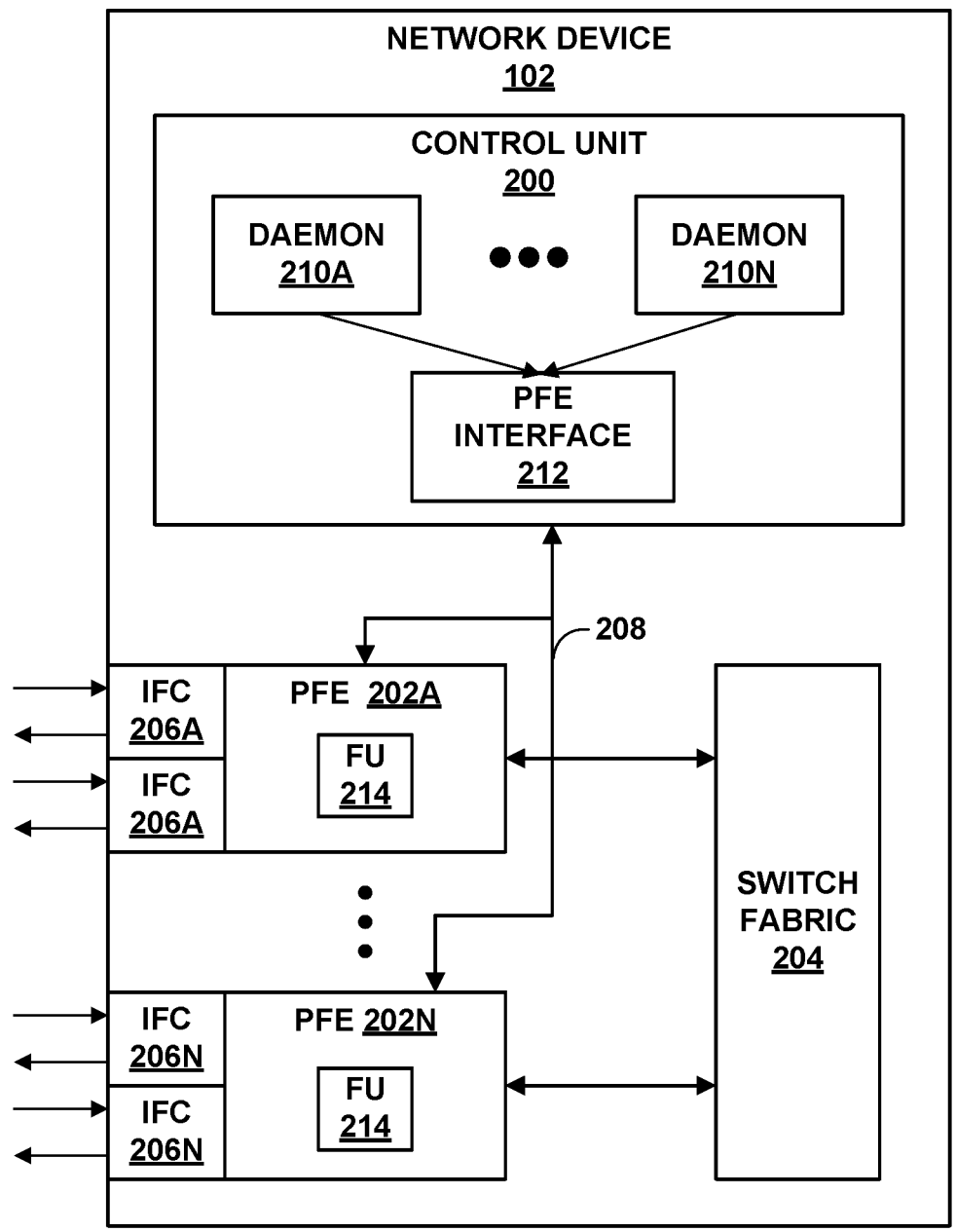
FIG. 2 is a block diagram illustrating an example network device that includes a routing consistency checker in accordance with principles described in this disclosure.

FIG. 2 is a block diagram illustrating an example network device 102 that monitors consistency of entries into forwarding tables in accordance with principles described in this disclosure. Network device 102 may comprise a router such as a provider edge or customer edge router, a core router, or another type of network device, such as a switch.

In this example, network device 102 includes a control unit 200 that provides control plane functionality for the device. Network device 102 also includes a plurality of forwarding components in the form of example packet forwarding engines 202A-202N ("PFEs 202") and a switch fabric 204 that together provide a data plane for forwarding network traffic. PFEs 202 receive and send data packets via interfaces of interface cards 206A-206N ("IFCs 206") each associated with a respective one of PFEs 202. Each of PFEs 202 and its associated ones of IFCs 206 may reside on a separate line card for network device 102 (not shown). Example line cards include flexible programmable integrated circuit (PIC) concentrators (PFCs), dense port concentrators (DPCs), and modular port concentrators (MPCs). Each of IFCs 206 may include interfaces for various combinations of layer two (L2) technologies, including Ethernet, Gigabit Ethernet (GigE), and Synchronous Optical Networking (SONET) interfaces. In various aspects, each of PFEs 20 may comprise more or fewer IFCs. Switch fabric 204 provides a high-speed interconnect for forwarding incoming data packets to the selected one of PFEs 202 for output over a network.

Control unit 200 is connected to each of PFEs 202 by internal communication link 208. Internal communication link 208 may comprise a 100 Mbps Ethernet connection, for instance. Daemons 210A-210N ("daemons 210") executed by control unit 200 are user-level processes that run network management software, execute routing protocols to communicate with peer routing devices, maintain and update one or more routing tables, and create one or more forwarding tables for installation to PFEs 202, among other functions. Collector daemon 114 is an example of daemons 210 executed by control unit 200. Daemons 210 are communicatively couple to PFEs 202 via a PFE interface 212 within control unit 200.

Control unit 200 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 12 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

PFEs 202 process packets by performing a series of operations on each packet over respective internal packet forwarding paths as the packets traverse the internal architecture of network device 102. Operations may be performed, for example, on each packet by any of a corresponding ingress interface, an ingress PFE 202, an egress PFE 202, an egress interface or other components of network device 102 to which the packet is directed prior to egress, such as one or more service cards. PFEs 202 each include hardware and/or software forwarding units (FUs) 214 that examine the contents of each packet (or another packet property, e.g., incoming interface) to make forwarding decisions, apply filters, and/or perform accounting, management, traffic analysis, and/or load balancing. In one example, each of PFEs 202 arranges forwarding units 214 as next hop data that can be chained together as a series of "hops" along an internal packet forwarding path for the network device. The result of packet processing determines the manner in which a packet is forwarded or otherwise processed by PFEs 202 from its input interface on one of IFCs 206 to its output interface on one of IFCs 206.

Forwarding units 214 include a lookup data structure (sometimes referred to as a "forwarding table") to perform lookup operations, such as a tree (or trie) search, a table (or index) search, a filter determination and application, or a rate limiter determination and application. Lookup operations locate a routing entry that matches packet contents or another property of the packet or packet flow, such as the inbound interface of the packet. As described below, forwarding units 214 also include a consistency data structure (sometime referred to as a "consistency table") to store attributes of the routing entries to facilitate generating consistency information for a consistency check. In some examples, the forwarding table and the consistency table are stored in separate data structures. Alternatively, in some examples, the forwarding table and the consistency table may be stored in the same data structure.

As described below, control unit 200 maintains a routing information base (RIB). The RIB includes information that defines a topology of a network, including one or more routing tables and/or link-state databases. Control unit 200 selects active routes through the network and then installs these routes to a forwarding information base ("FIB"). Typically, the FIB is a radix or other lookup tree to map packet information (e.g., header information having destination information and/or a label stack) to next hops and ultimately to interface ports of interface cards associated with respective PFEs 202. The forwarding tables of PFEs 202 are updated based on the FIB. From time-to-time, control unit 200 changes and/or updates the RIB as the topology of the network changes. Additionally, control unit 200 may change the FIB to reflect these changes and to update the active routes (e.g., when necessary). These changes may take time to be implemented in the forwarding tables of PFEs 202. Typically, communication between control unit 200 and PFEs 202 is asynchronous and there may be slow PFEs 202 and faster PFEs 202 installed in network device 102. As describe below, the RIB, FIB, and forwarding tables are further sub-categorized into zones. Each zone comprises one or more active routes in the network topology. Control unit 200, via collector daemon 114, checks the consistency of the RIB, FIB, and the forwarding tables of PFEs 202. The RIB, FIB, and the forwarding tables are consistent when the routes in each of the zones in each of the FIB and the forwarding tables match the routes as specified for those zones by the RIB. An error is generated when the RIB, FIB, and forwarding tables are not consistent. In some examples, when the RIB, FIB, and forwarding tables are not consistent, control unit 200, via collector daemon 114, determines which entries are causing the inconsistency by performing an entry-by-entry comparison of the zones that are not consistent.

Figure 3:
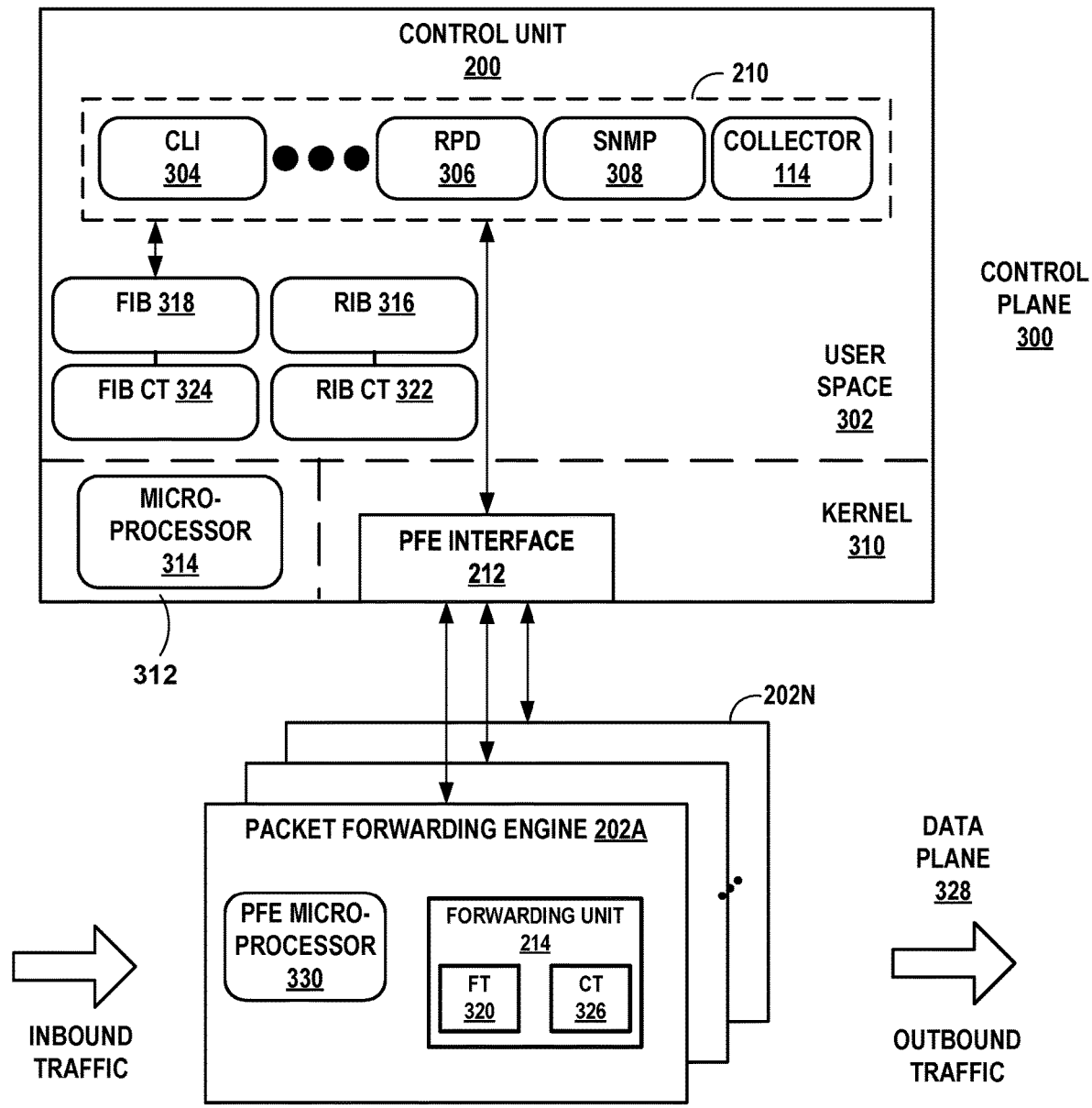
FIG. 3 is a block diagram illustrating an example embodiment of the network device of FIG. 1 in further detail.

FIG. 3 is a block diagram illustrating an example embodiment of network device 102 of FIGS. 1 and 2 in further detail. In this example, control unit 200 provides a control plane 300 operating environment for execution of various user-level daemons 210 executing in user space 302. Daemons 210 in this example include command-line interface daemon 304 ("CLI 304"), routing protocol daemon 306 ("RPD 306"), Simple Network Management Protocol daemon 308 ("SNMP 308"), and collector daemon 114 ("collector 114"). In this respect, control plane 300 may provide routing plane, service plane, and management plane functionality for network device 102. Various instances of control unit 200 may include additional daemons 210 not shown in FIG. 3 that perform other control, management, or service plane functionality and/or drive and otherwise manage data plane functionality for network device 102.

Daemons 210 operate over and interact with kernel 310, which provides a run-time operating environment for user-level processes. Kernel 310 may comprise, for example, a UNIX operating system derivative such as Linux or Berkeley Software Distribution (BSD). Kernel 310 offers libraries and drivers by which daemons 210 may interact with the underlying system. PFE interface 212 of kernel 310 comprises a kernel-level library by which daemons 210, such as collector daemon 114, and other user-level processes or user-level libraries may interact with PFEs 202. PFE interface 212 may include, for example, a sockets library for communicating with PFEs 202 over dedicated network links.

Hardware environment 312 of control unit 200 comprises microprocessor 314 that executes program instructions loaded into a main memory (not shown in FIG. 3) from storage (also not shown in FIG. 3) in order to execute the software stack, including both kernel 310 and user space 302, of control unit 200. Microprocessor 314 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 306 executes one or more interior and/or exterior routing protocols to exchange routing information with other network devices and store received routing information in routing information base 316 ("RIB 316"). RIB 316 may include information defining a topology of a network, including one or more routing tables and/or link-state databases. RPD 306 resolves the topology defined by routing information in RIB 316 to select or determine one or more active routes through the network and then installs these routes to forwarding information base 318 ("FIB 42"). As used here, the information in the RIB 216 used to define each route is referred to as a "routing entry." Typically, RPD 306 generates FIB 318 in the form of a radix or other lookup tree to map packet information (e.g., header information having destination information and/or a label stack) to next hops and ultimately to interface ports of interface cards associated with respective PFEs 202.

As described below, RPD 306 divides the route entries in the RIB 316, the FIB 318, and forwarding stables 320 of PFEs 202 into zones. Each routing entry is assigned a zone identifier. A zone is a collection of routing entries of a same type (e.g., route objects, NH objects, or general config objects, etc.). Routing entries may be classified into zones based on routing entry characteristics (e.g., daemon ID, prefix/prefix length, family, routing table kernel index, etc.). Daemon ID identifies all objects created by a particular daemon 210. When a routing entry is added to RIB 316, RPD 306 adds it to a zone. In some examples, RPD 306 assigns the new routing entry into a zone that is of the correct type that is least populated. Additionally, in some examples, when a routing entry is added, RPD 306 calculates an individual checksum based on the contents of the routing entry. Upon receiving the new routing entry, kernel 310 adds a timestamp to the routing object indicative of when then routing entry was added to FIB 316. This timestamp is communicated to RPD 306 and the PFE 202. The zone ID, timestamp, the individual checksum, and other zonal metadata are stored in a consistency table associated with RIB 316 (e.g., a RIB consistency table (CT) 322). The new routing entry is forwarded to kernel 310 and PKEs 202. Upon receipt, kernel 310 calculates the individual checksum for the new routing entry and stores the zone ID, the timestamp, the individual checksum, and other zonal metadata are stored in a consistency table associated with FIB 318 (e.g. a FIB CT 318). Upon receipt, PFEs 202 calculate the individual checksum for the new routing entry and stores the zone ID, the timestamp, the individual checksum, and other zonal metadata are stored in a consistency table associated with forwarding tables 320 (e.g., PFE CTs 326) in association with the corresponding routing entries.

From time-to-time, RPD 306 generates a marker with an associated timestamp generated by the kernel 310. RPD 306 places the marker in kernel 310 to initiate a consistency check. The marker causes kernel 310 to propagate the marker to PFEs 202 and acknowledge reception of the marker. PFEs 202 also acknowledge reception of the marker. In some examples, RPD 306 generates the marker after making a threshold number of changes to RIB 316. The marker causes RPD 306, kernel 310, and PFEs 202 to perform consistency checks on RIB 316, FIB 318, and forwarding tables 320 respectively. Additionally, RPD 306 may reissue a marker (e.g., sends a marker with the same ID and timestamp) in response to receiving a "NACK" message (e.g., any message indicative that an inconsistency was found) from collector daemon 114 in response the consistency check. After a receiving a threshold number of NACK messages, RPD 306 may generate a brute force marker that causes RPD 306, kernel 310, and PFEs 202 to provide to collector daemon 114 the consistency information and information about individual routing entries (e.g., the individual checksum for each routing entry, etc.) from the RIB 316, FIB 318, and forwarding tables 320 respectively. In some examples, RPD 306 may reissue the brute force marker a threshold number times so collector daemon 114 is able to filter out any false positive.

Command line interface daemon 304 ("CLI 304") provides a shell by which an administrator or other management entity may modify the configuration of network device 102 using text-based commands. Simple Network Management Protocol daemon 308 ("SNMP 308") comprises an SNMP agent that receives SNMP commands from a management entity to set and retrieve configuration and management information for network device 102. Using CLI 304 and SNMP 308, management entities may enable/disable and configure services, install routes, enable/disable and configure rate limiters, and configure interfaces, for example. As described in detail below, RPD 306, CLI 304, and SNMP 308 configure data plane 328 to implement configured services, and otherwise add/modify/delete routes.

Collector daemon 114 collects consistency information from RPD 306, kernel 310, and PFEs 202 based on the zones of routing entries in RIB 316, FIB, 318, and forwarding tables 320 respectively. In response to RPD 306 generating a marker, RPD 306, kernel 310, and PFEs 202 provide consistency information to collector daemon 114. The consistency information includes a zone-by-zone count of the number of routing entries in each zone (sometimes referred to as a "zonal count") and a zone-by-zone calculation of a checksums based on the individual routing entries in each zone (sometimes referred to as a "zonal checksum"). Initially, collector daemon 114 performs a zone-by-zone comparison of the zonal counts between RIB 316, FIB, 318, and forwarding tables 320. If any zonal count does not match between RIB 316, FIB, 318, and forwarding tables 320, collector 114 determines there is an inconsistency and sends a NACK message to RPD 306 and ends the consistency check. Collector daemon 114 performs a zone-by-zone comparison of the zonal checksums between RIB 316, FIB, 318, and forwarding tables 320. If any zonal checksum does not match between RIB 316, FIB, 318, and forwarding tables 320, collector 114 determines there is an inconsistency and sends a NACK message to RPD 306. When both the zonal counts and zonal checksums indicate that routing entries are consistent, collector daemon 114 sends an "ACK" message (e.g., any message indicative that no inconsistency was found).

In some example, a consistency check may be a result of a brute force marker. In such examples, collector daemon receives a value representative of the routing entries (e.g., the individual checksums) for each routing entry in RIB 316, FIB, 318, and forwarding tables 320. Collector daemon 114 performs an entry-by-entry comparison of these representative values to identify which specific entries are inconsistent between RIB 316, FIB, 318, and forwarding tables 320. In some such examples, collector daemon 114 performs the techniques described about to first determine which zones have routing entries that are inconsistent. In such examples, collector daemon 114 performs the entry-by-entry comparison on the inconsistent zone(s). Collector daemon 114 reports (e.g., to RPD 306, etc.) which routing entries are found to be inconsistent. In some examples, RPD 306 may cause the brute force consistency check to be performed multiple times. In such examples, collector daemon 114 tracks the routing entries found to be inconsistent and reports any routing entry that is found to be inconsistent over multiple brute force consistency checks, and in some examples, not report routing entries that are found to be inconsistent in only one brute force consistency check.

PFEs 202 implement data plane 328 (also known as a "forwarding plane") functionality to handle packet processing from ingress interfaces on which packets are received to egress interfaces to which packets are sent. Data plane 328 determines data packet forwarding through network device 102, applies services, rate limits packet flows, filters packets, and otherwise processes the packets using forwarding table 320 installed by control plane 300 to data plane 328. While FIG. 3 illustrates only PFE 202A in detail, each of PFEs 202 comprises similar components that perform substantially similar functionality.

PFE 202s bind actions to be performed on packets received by the PFEs to identification of one or more properties of the packets. That is, upon identifying certain packet properties, PFEs 202 perform the action bound to the properties. Packet properties may include packet metadata such as a particular packet's ingress interface or egress interface (as determined by the PFEs) as well as information carried by the packet and packet header, such as packet header fields, destination route prefixes, layer four (L4) or Transport Layer protocol destination ports, and the packet payload. Actions bound to packet characteristics may include count, discard, forward to a specified next-hop or interface, filter, sample, rate limit, and Quality of Service (QoS) marking, differential services (DiffServ), load balance, intrusion detection and prevention, L2 class of service (CoS), and L2 or L2 Virtual Private Network (L2VPN) switching.

PFE microprocessor 330 may execute a microkernel to provide an operating environment for processing packets through the forwarding unit 214 and to perform PFE-level consistency checks. PFE microprocessor 330 may, for example, perform operations in support of the consistency check, such as calculating checksums for each routing entry zone (e.g., zonal checksums) and performing a count of each routing entry in each zone (e.g., zonal counts). In some examples, in response to receiving an indicator to perform a consistency check, PFE microprocessor 330 acknowledges the request and, using the individual checksums stored in consistency table 326, calculates a checksum for each zone as defined in the consistency table 326. Additionally, PFE microprocessor 330 counts each routing entry in each zone. PFE microprocessor 330 sends the zonal checksums and the zonal entry counts (collectively "consistency information") to collector daemon 114. In response to receiving an indicator to perform a brute force consistency check, PFE microprocessor 330 generates the consistency information and provides values representative of each routing entry (e.g., the individual checksum, etc.).

Figure 4:
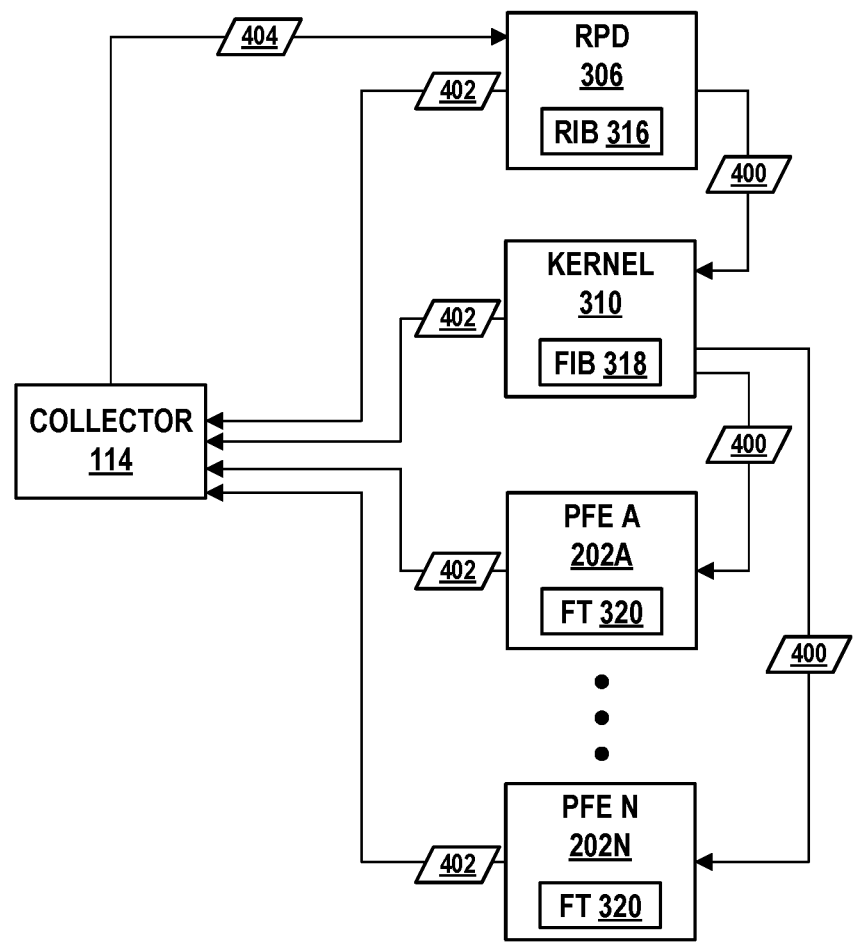
FIG. 4 is a block diagram illustrating a collector daemon performing a consistency check in accordance with principles described in this disclosure.

FIG. 4 is a conceptual diagram illustrating collector daemon 114 performing a consistency check in accordance with principles described in this disclosure. RPD 306 generates a marker 400. For example, RPD 306 may (a) periodically generate marker 400 (e.g., every hour, every day, etc.), (b) generate marker 400 in response to an event (e.g., a reboot of network device 102, etc.), (c) generate marker 400 after making a threshold number of changes to routing entries to RIB 316, and/or (d) generate marker 400 after a threshold number of time slices of processing time (sometimes referred to as an "epoch") of microprocessor 314. RPD 306 communicates maker 400 to kernel 310. In some examples, RPD 306 places marker 400 into the epoch queue of kernel 310. Kernel 310 generates the timestamp for marker 400 and communicates it back to RPD 306. Kernel 310 also communicates marker 400 and the timestamp to PFEs 202. Upon receiving marker 400, kernel 310 and PFE 202s send a response to RPD 306 acknowledging marker 400. In response to the responses acknowledging the marker, RPD 306 sends a compute message. Upon receipt of the compute message, kernel 310 and PFEs 202 begin to calculate consistency information 402. Additionally, RPD 306 calculates consistency information 402 for RIB 318. In some examples, when kernel 310 and/or PFEs 202 fail to acknowledge marker 400, RPD 306 may reissue marker 400 and/or may generate an error (e.g., to be communication to an administrator).

RPD 306, kernel 310, and PFEs 202 each calculate consistency information 402. The consistency information 402 is sent to collector daemon 114. In some examples, RPD 306, kernel 310, and PFEs 202 also send messages indicating that they are done calculating consistency information 402 (e.g., a "completion message"). In some such examples, collector daemon 114 is aware of the RPD 306, kernel 310 and each of PFE 202 such that if the collector 114 does not receive a completion message from all of the expected sources in a threshold amount of time, collector daemon 114 sends a status message 404 that includes a NACK message. Collector daemon 114 performs a consistency check on consistency information 402 provided by RPD 306, kernel 310, and PFEs 202. When collector daemon 114 determines that one or more of the zones include consistent routing entries, it sends status message 404 that includes a NACK message. Otherwise, when collector daemon 114 determines that the zones across the RIB 316, FIB 318, and forwarding tables 320 are consistent, it sends status message 404 with an ACK message.

Figure 5:
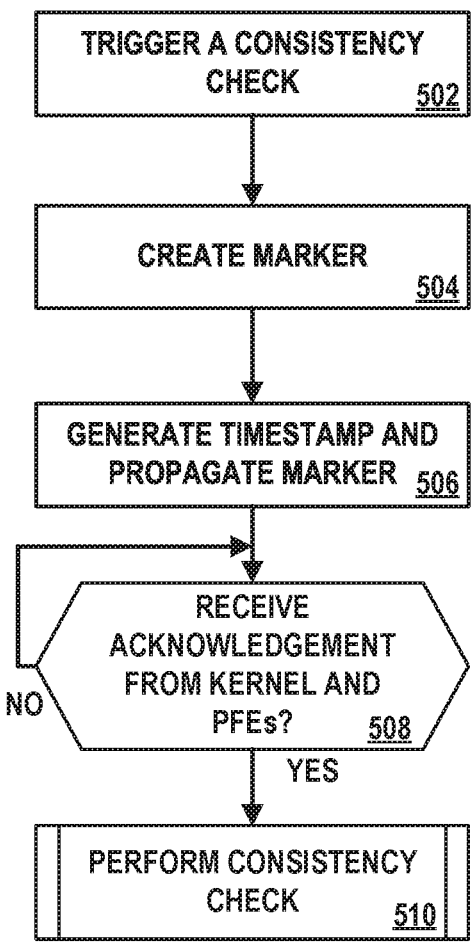
FIG. 5 is a flowchart of an example method to initiate a consistency check on forwarding tables of packet forwarding engines in accordance with principles described in this disclosure.

FIG. 5 is a flowchart of an example method to initiate a consistency check between routing entries in RIB 316, FIB 318, and forwarding tables 320 in accordance with principles described in this disclosure. Initially, RPD 306 triggers a consistency check (502). RPD 306 may, for example, trigger the consistency check in response to an event (e.g., a reboot of the network device 102, etc.) or in response to a threshold number of changes to the routing entries in RIB 316 (sometimes referred to as "churn"). RPD 306 generates marker 400 (502). For example, RDP 306 may insert marker 400 into an epoch of kernel 310. Upon processing marker 400, kernel 310 assigns a timestamp to marker 400 and propagates marker 400 with the timestamp to PFEs 202 (e.g., by sending marker 400 via PFE interface 212, etc.) (506). Kernel 310 also sends the timestamp to RPD 306. RPD 306 continues to wait (NO at 508) until an acknowledgement has been received from kernel 310 and PRFs 202. In some examples, after a threshold amount of time, RDP 306 may generate an error if it has not received acknowledgement for kernel 310 and PFEs 202. When acknowledgement has been received (YES at 506), the system continues with the consistency check (510). An example method of performing the consistency check is described in FIG. 6 below.

Figure 6:
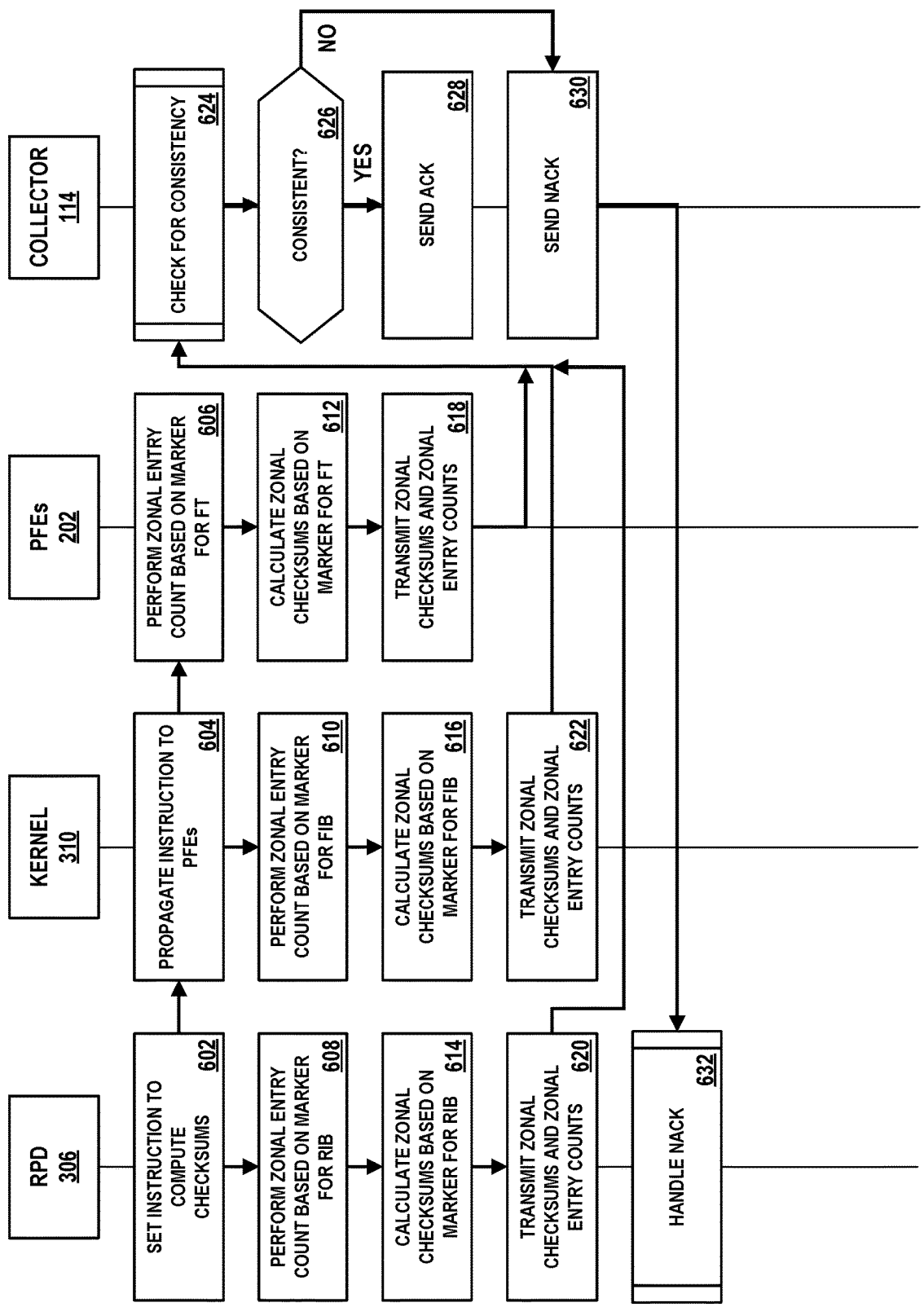
FIG. 6 is a flowchart of an example method to determine consistency information to perform a consistency check on forwarding tables of packet forwarding engines in accordance with principles described in this disclosure.

FIG. 6 is a flowchart of an example method to determine consistency information to perform a consistency check on forwarding tables of packet forwarding engines in accordance with principles described in this disclosure. After receiving acknowledgments from kernel 310 and PFEs 202, RPD 306 sets an instruction (sometimes referred to as a "computer message") to kernel 310 to compute checksums (602). Kernel 310 propagates the instruction to PFEs 202 (604). RPD 306, kernel 310, and PFEs 202 preform zonal entry counts based on the timestamp of marker 400 (606, 608, 610 respectively). To perform zonal entry counts, the respective component performs a zone-by-zone count of routing entries in each zone that are associated with a timestamp (e.g., stored in the corresponding consistency table 322, 324, and 326) that is earlier than the timestamp associated with marker 400. RPD 306, kernel 310, and PFEs 202 calculate zonal checksums based on the timestamp of marker 400 (612, 614, 616 respectively). To perform zonal checksums, the respective component performs a zone-by-zone checksum calculation of routing entries (e.g., using the individual checksums stored in the corresponding consistency table 322, 324, and 326) in each zone that are associated with a timestamp that is earlier than the timestamp associated with marker 400. In some examples, while kernel 310 or one of PFEs 202 are calculating a checksum for a zone, a routing entry for that zone may change (e.g., a previous routing entry update is finally applied to the particular PFE 200, etc.). An example method to handle this situation is described in FIG. 10 below. RPD 306, kernel 310, and PFEs 202 send the zonal counts and the zonal checksums (e.g., consistency information 402) to collector daemon 114. (618, 620, 622 respectively). While blocks 606-622 are described together above, because of the varying processor capacities and processing loads, RPD 306, kernel 310, and each of PFEs 202 performs the steps asynchronously while collector daemon 114 waits for consistency information 402 from each component.

After receiving consistency information 402 from RPD 306, kernel 310, and PFEs 202, collector daemon 114 checks for consistency of RIB 316, FIB 318, and forwarding tables 320 (624). An example method of checking for consistency is described in FIG. 7 below. When all of the zones of RIB 316, FIB 318, and forwarding tables 320 are consistent (YES at 626), collector daemon 114 sends status message 404 with an ACK message (630). When at least one of the zones of RIB 316, FIB 318, and forwarding tables 320 is not consistent (NO at 626), collector daemon 114 sends status message 404 with a NACK message (632). RPD 306 handles status message 404 that contains a NACK message (634). An example method of handling a NACK message is described in FIG. 8 below.

Figure 7:
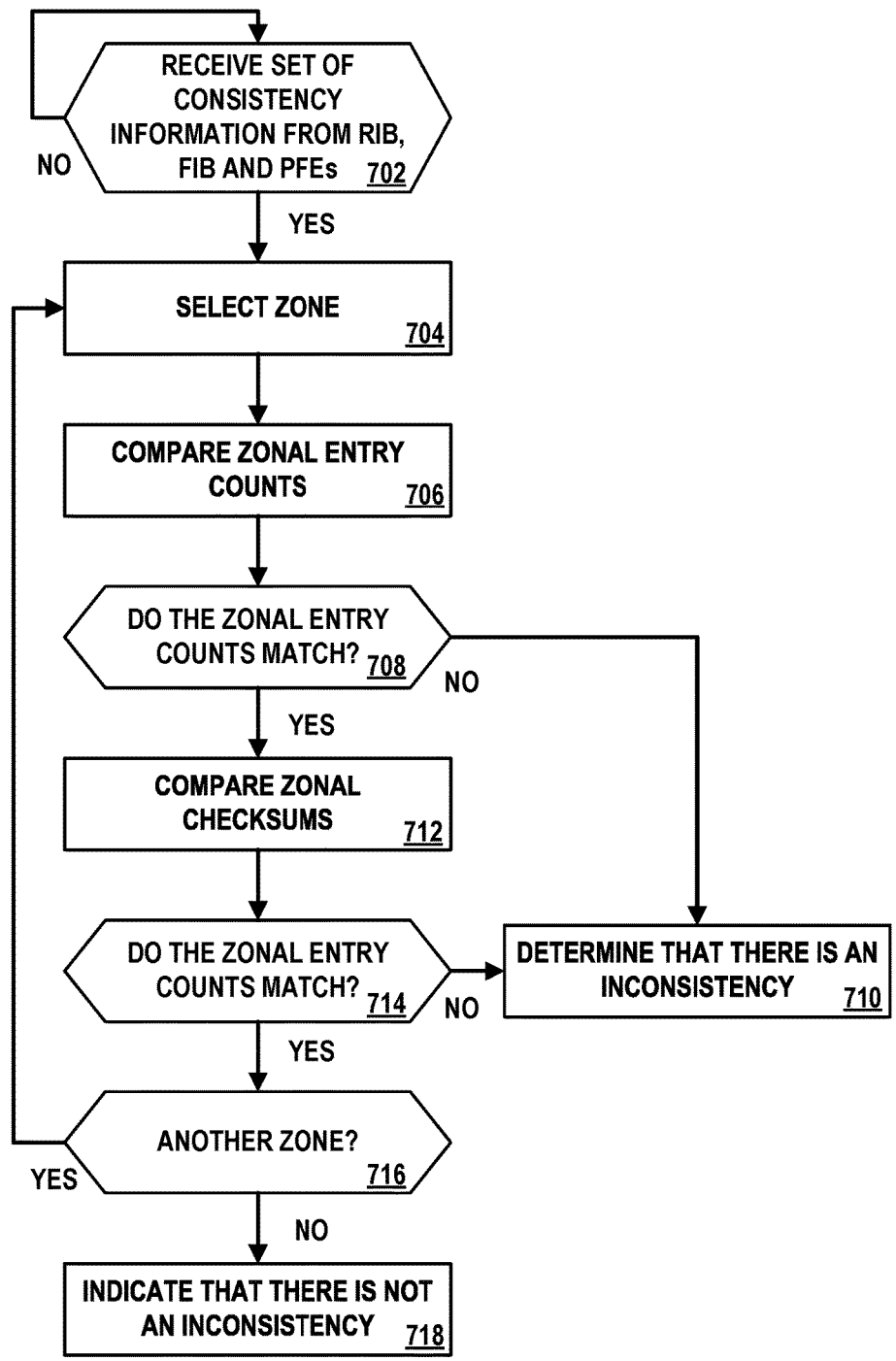
FIG. 7 is a flowchart of an example method to check for consistency on forwarding tables of packet forwarding engines in accordance with principles described in this disclosure.

FIG. 7 is a flowchart of an example method to check consistency of forwarding tables 320 of PFEs 202, RIB 316 and, FIB 318 in accordance with principles described in this disclosure. Collector daemon 114 waits (NO at 702) until all consistency information 402 has be received from RPD 306, kernel 310, and PFEs 202 (702). In some examples, collector daemon 114 sends a status message 404 with a NACK message when collector daemon 114 has waited for a threshold period of time without receiving all of the expected consistency information 402. When all consistency information 402 has be received (YES at 702), collector daemon 114 selects a zone (704). Collector daemon 114 compares the zonal counts in consistency information 402 (706). In some examples, the zonal counts may be subdivided into sub-counts that categorize the routing entries assigned to a zone into characteristic-based sub-groups (e.g., number of routes, number of routes less than 24 bits, number of routes less than 48 bits, number of routes less than 96 bits, number of routes greater than 96 bits, etc.). When the zonal entry counts do not all match (NO at 708), collector daemon 114 determines that there is an inconsistency between at least two of the RIB 316, FIB 318, and/or one or more of forwarding tables 320 (710). In some examples, upon determining that there is an inconsistency, collector daemon 114 sends a status message 404 with a NACK message (see block 634 of FIG. 6 above).

When the zonal entry counts all match (YES at 708), collector daemon 114 then compares zonal checksums for the selected zone (712). When the zonal checksums do not all match (NO at 714), collector daemon 114 determines that there is an inconsistency between at least two of the RIB 316, FIB 318, and/or one or more of forwarding tables 320 (710). When the zonal checksums all match (YES at 714), collector daemon 114 determines whether there is another zone to check (716). When there is another zone (YES at 716), collector daemon 114 selects the next zone to check (704). Otherwise, where there is not another zone (NO at 716), collector daemon 114 determines that the RIB 316, FIB 318, and forwarding tables 320 are consistent (718). In some examples, collector daemon 114 subsequently sends a status message 404 with an ACK message (see block 630 of FIG. 6 above).

Figure 8:
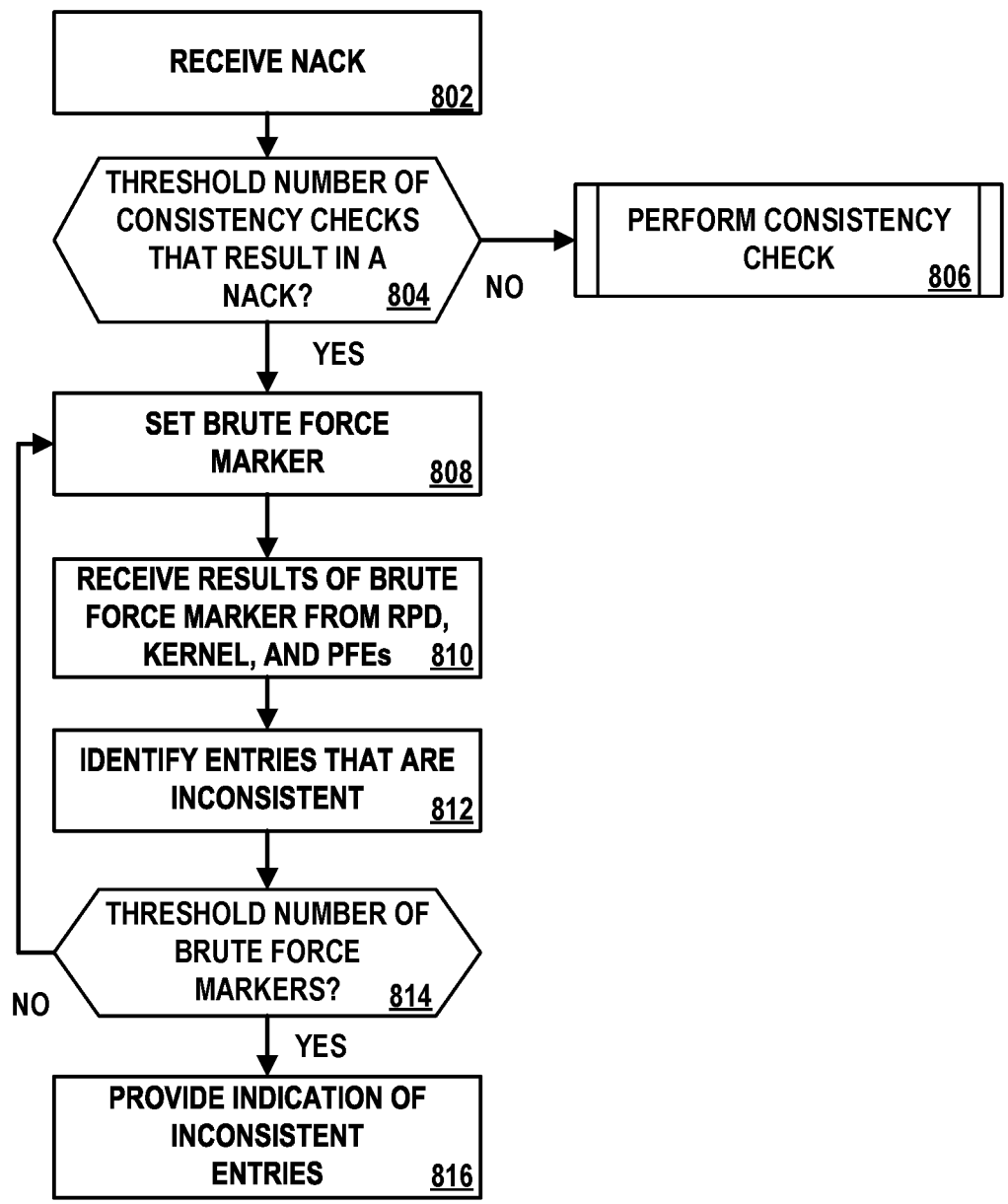
FIG. 8 is a flowchart of an example method to initiate a brute force consistency check on forwarding tables of packet forwarding engines in accordance with principles described in this disclosure.

FIG. 8 is a flowchart of an example method to initiate a brute force consistency check on forwarding tables of packet forwarding engines in accordance with principles described in this disclosure. Initially, RPD 306 receives a status message 404 with a NACK message indicative that, during the most recent consistency check, at least one zone was determined to not be consistent (802). RPD 306 determines whether a threshold number (e.g., three, five, seven, etc.) of consistency check that have results in at least one NACK message have occurred in response to consecutive consistency checks (804). For example, because RPD 306 may initiate a consistency check before a routing entry update is reflected in forwarding tables 320 of one or more of the PFEs 202, one of forwarding tables 320 may be inconsistent for one consistency check but may be consistent for the subsequent consistency check. In such a manner, collector daemon 114 facilitates checking consistency while having some tolerance for slow-to-update PFEs 202. When a threshold number consistency checks has not been met (NO at 804), RPD 306 performs a subsequent consistency check (e.g., by reissuing the marker with the same timestamp that caused the previous consistency check) (806).

When a threshold number of consistency checks have resulted in at least one NACK message (YES at 804), RPD 306 issues a brute force marker (808). The brute force marker causes RPD 306, kernel 310 and PFEs 202 to forward consistency information 402 and information representative of every routing entry (e.g., the individual checksums, the routing entry, etc.) contained in RIB 316, FIB 318, and forwarding tables 320 to collector daemon 114. This representative information is unique for every routing entry such that by performing a zone-by-zone comparison of the representative information, collector daemon 114 is able to determine which specific routing entries are inconsistent. Collector daemon 114 receives the results (e.g., consistency information 402 and representative information, etc.) of the brute force marker from RPD 306, kernel 310, and PFEs 202 (810). Based on the consistency information 402 and representative information, collector daemon 114 identifies routing entries that are inconsistent (812). In some examples, collector daemon 114 may first perform zone-by-zone comparisons (e.g., using zonal counts and/or zonal checksums, etc.) to determine which zone have inconsistent routing entries and then may perform the entry-by-entry check on those zones.

RPD 306 determines whether the brute force marker has been set a threshold number of times (814). For example, RPD 306 may issue the brute force marker up to three times to eliminate false positive results. When the brute force marker has not been set a threshold number of times (NO at 814), then collector daemon 114 causes the brute force marker to be reissued (808). Otherwise, when the brute force marker has been set a threshold number of times, collector daemon 114 provides an indication (e.g., via a graphical interface) of the inconsistent entries (816). In some examples, collector daemon 114 provides the indication of routing entries that are inconsistent over multiple iterations of the brute force marker.

Figure 9:
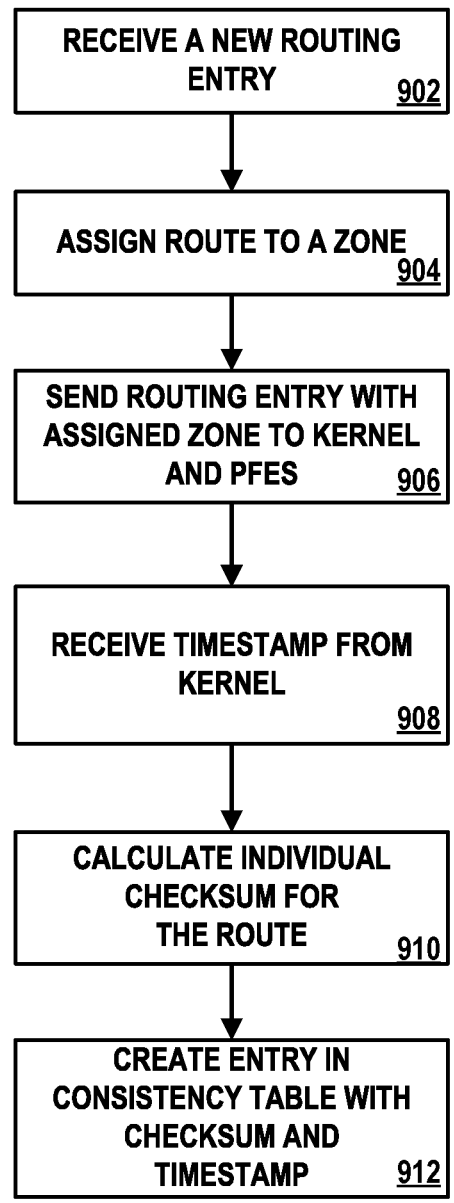
FIG. 9 is a flowchart of an example method to add an entry into a routing information base in accordance with principles described in this disclosure.

FIG. 9 is a flowchart of an example method to add an entry into RIB 316 in accordance with principles described in this disclosure. Initially, RPD 306 receives a new routing entry to be added to RIB 316 (902). For example, an administrator may add a routing entry via CLI daemon 304. RPD 306 assigns the new routing entry to one of the zones defined within RIB 316 (904). RPD 306 assigns the new routing entry based on the characteristics of the new routing entry and/or the characteristics of the zones. For example, RPD 306 may assign the new routing entry to a zone with the lowest number of entries. As another example RPD 306 may assign the new routing entry to a zone that includes similar types of routing entries. RPD 306 sends the new routing entry and an identifier of the assigned zone to kernel 310 and PFEs 202 (906). RPD 306 receives a timestamp from kernel 310 (908). RPD 306 calculates an individual checksum for the new routing entry (910). Additionally, RPD 306 generates an entry in RIB consistency table 322 that includes (a) the zone ID, (b) the individual checksum, and (c) the timestamp (912) (sometimes collectively referred to as "consistency values"). Similarly, kernel 310 and PFEs 202 calculate an individual checksum for the new routing entry and generate entries in their respective consistency tables.

Figure 10:
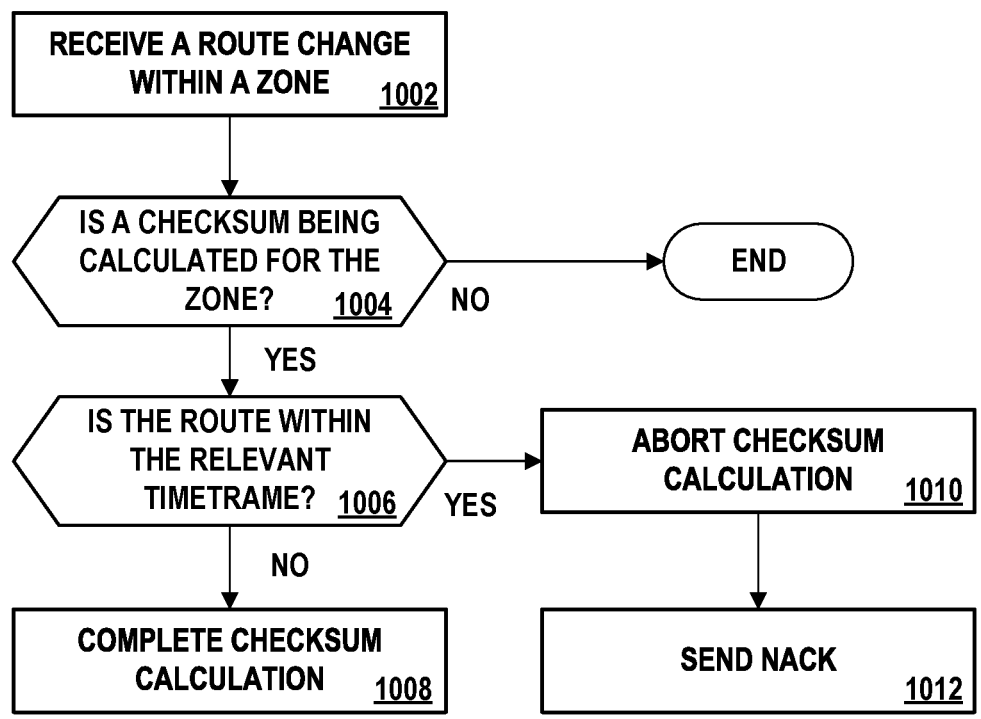
FIG. 10 is a flowchart of an example method to handle a route update while performing a consistency check in accordance with principles described in this disclosure.

FIG. 10 is a flowchart of an example method to handle a routing entry update while performing a consistency check in accordance with principles described in this disclosure. From time-to-time, because timing of updates to routing entries can be sporadic and communication between PFEs 202 and RPD 306 is asynchronous, a PFE 202 may receive an update to forwarding table 320 while performing a consistency check (1002). PFE 202 determine whether it is currently calculating a checksums for the zone to which the routing entry is assigned (1004). When PFE 202 is not currently calculating a checksums for the zone to which the routing entry is assigned (NO at 1004), the method ends. When PFE 202 is currently calculating a checksums for the zone to which the routing entry is assigned (YES at 1004), PFE 202 determines whether the routing entry in within a relevant timeframe (1006). The routing entry is within a relevant timeframe when the timestamp associated with the routing entry is prior to the timestamp of the marker that caused the consistency check. When the routing entry is not within a relevant timeframe (NO at 1006), PFE 202 continues to calculate the zonal checksum (1008). When the routing entry is within a relevant timeframe (YES at 1006), PFE 202 aborts (e.g., discontinues) the checksum calculation (and the consistency check) 1010. PFE 202 then sends a status message 404 with a NACK message.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
generating, by a routing protocol daemon (RPD) operating on a control plane of a network device, a marker timestamp that initiates a consistency check;
in response to the marker timestamp, calculating, by each of the RPD, a control plane kernel, and packet forwarding engines of the network device, zonal checksums for a plurality of zones within a routing information base (RIB), a forwarding information base (FIB), and corresponding forwarding tables respectively, wherein each zonal checksum is calculated based on consistency values for routing objects having timestamps prior to the marker timestamp and that are assigned to one zone of the plurality of zones;
performing, by a collector daemon operating on the control plane of the network device, the consistency check based on comparing the zonal checksums calculated for each zone of the plurality of zones within the RIB, the FIB, and the forwarding tables to determine whether the routing objects in each of the RIB, the FIB, and the forwarding tables are consistent with each other; and
when the RIB, the FIB, and the forwarding tables are not consistent with each other, performing an action related to at least one of RIB, the FIB, or the forwarding tables.

2. The method of claim 1, wherein the routing objects in each of the RIB, the FIB, and the forwarding tables are not consistent with each other when the zonal checksum for the routing objects assigned to at least one zone of the plurality of zones does not match between the RIB, the FIB, and the forwarding tables.

3. The method of claim 1, further comprising, in response to the marker timestamp, calculating, by each of the RPD, the control plane kernel, and the packet forwarding engines, zonal counts of the routing objects for each zone of the plurality of zones.

4. The method of claim 3, wherein performing the consistency check includes:
comparing the zonal counts calculated for each zone of the plurality of zones within the RIB, the FIB, and the forwarding tables, and determining that the routing objects in each of the RIB, the FIB, and the forwarding tables are not consistent with each other when the zonal count for at least one zone of the plurality of zones does not match between the RIB, the FIB, and the forwarding tables; and
when the zonal counts do match between the RIB, the FIB, and the forwarding tables, comparing the zonal checksums calculated for each zone of the plurality of zones within the RIB, the FIB, and the forwarding tables, and determining that the routing objects in each of the RIB, the FIB, and the forwarding tables are not consistent with each other when the zonal checksum for the routing objects assigned to at least one zone of the plurality of zones does not match between the RIB, the FIB, and the forwarding tables.

5. The method of claim 1, wherein performing the action includes:
sending, by the collector daemon, a message to the RPD indicating that an inconsistency is found; and
when the consistency check has not been repeated using the same marker timestamp a threshold number of times, initiating, by the RPD, a repeat of the consistency check by reissuing the marker timestamp.

6. The method of claim 1, wherein performing the action includes:
sending, by the collector daemon, a message to the RPD indicating that an inconsistency is found;
when the consistency check has been repeated using the marker timestamp a threshold number of times, generating, by the RPD, a brute force marker;
in response to the brute force marker, calculating, by each of the RPD, the control plane kernel, and the packet forwarding engines, the zonal checksums; and
providing, by each of the RPD, the control plane kernel, and the packet forwarding engines, values representative of each of the routing objects in the RIB, the FIB, and the forwarding tables respectively to the collector daemon.

7. The method of claim 6, further comprising determining, by the collector daemon, which of the routing objects are inconsistent between the RIB, the FIB, and the forwarding tables based on the values representative of each of the routing objects.

8. A network device comprising:
a control unit comprising a processor executing a kernel, the kernel operating a routing protocol daemon (RPD) and communicatively coupled to a collector daemon, the control plane storing a routing information base (RIB) and an associated first consistency table and a forwarding information base (FIB) and an associated second consistency table; and
a plurality of packet forwarding engines, each packet forwarding engine storing a forwarding table and an associated third consistency table;
wherein the RPD is configured to generate a marker timestamp that initiates a consistency check,
wherein each of the RPD, the kernel, and the packet forwarding engines are configured to, in response to the marker timestamp, calculate zonal checksums for a plurality of zones within the RIB, the FIB, and the forwarding tables respectively, wherein each zonal checksum is calculated based on consistency values stored in the consistency tables for routing objects having timestamps prior to the marker timestamp and that are assigned to one zone of the plurality of zones, and
wherein the collector daemon is configured to:
perform the consistency check based on comparing the zonal checksums calculated for each zone of the plurality of zones within the RIB, the FIB, and the forwarding tables to determine whether the routing objects in each of the RIB, the FIB, and the forwarding tables are consistent with each other; and
when the RIB, the FIB, and the forwarding tables are not consistent with each other, perform an action related to at least one of RIB, the FIB, or the forwarding tables.

9. The network device of claim 8, wherein the routing objects in each of the RIB, the FIB, and the forwarding tables are not consistent with each other when the zonal checksum for the routing objects assigned to at least one zone of the plurality of zones does not match between the RIB, the FIB, and the forwarding tables.

10. The network device of claim 8, wherein the RPD, the kernel, and the packet forwarding engines are configured to, in response to the marker timestamp, calculate zonal counts of the routing objects for each zone of the plurality of zones.

11. The network device of claim 10, wherein to perform the consistency check, the collector daemon is further configured to:
compare the zonal counts calculated for each zone of the plurality of zones within the RIB, the FIB, and the forwarding tables, and determine that the routing objects in each of the RIB, the FIB, and the forwarding tables are not consistent with each other when the zonal count for at least one zone of the plurality of zones does not match between the RIB, the FIB, and the forwarding tables; and
when the zonal counts do match between the RIB, the FIB, and the forwarding tables, compare the zonal checksums calculated for each zone of the plurality of zones within the RIB, the FIB, and the forwarding tables, and determine that the routing objects in each of the RIB, the FIB, and the forwarding tables are not consistent with each other when the zonal checksum for the routing objects assigned to at least one zone of the plurality of zones does not match between the RIB, the FIB, and the forwarding tables.

12. The network device of claim 8,
wherein to perform the action, the collector daemon is configured to send a message to the RPD indicating that an inconsistency is found; and
wherein the RPD is configured to, when the consistency check has not been repeated using the same marker timestamp a threshold number of times, initiate a repeat of the consistency check by reissuing the marker timestamp.

13. The network device of claim 8,
wherein to perform the action, the collector daemon is configured to send a message to the RPD indicating that an inconsistency is found;
wherein the RPD is configured to, when the consistency check has been repeated using the marker timestamp a threshold number of times, generate a brute force marker; and
wherein each of the RPD, the kernel, and the packet forwarding engines are configured to, in response to the brute force marker:
calculate the zonal checksums, and
provide values representative of each of the routing objects in the RIB, the FIB and, the forwarding tables respectively to the collector daemon.

14. The network device of claim 13, wherein the collector daemon is configured to determine which of the routing objects are inconsistent between the RIB, the FIB, and the forwarding tables based on the values representative of each of the routing objects.

15. A non-transitory computer readable medium comprising instruction that, when executed, cause one or more processors of a network device to:
generate, by a routing protocol daemon (RPD) of the network device, a marker timestamp that initiates a consistency check;
in response to the marker timestamp, calculate, by each of the RPD, a control plane kernel, and packet forwarding engines of the network device, zonal checksums for a plurality of zones within a routing information base (RIB), a forwarding information base (FIB), and corresponding forwarding tables respectively, wherein each zonal checksum is calculated based on consistency values for routing objects having timestamps prior to the marker timestamp and that are assigned to one zone of the plurality of zones;
perform, by a collector daemon operating on the control plane of the network device, the consistency check based on comparing the zonal checksums calculated for each zone of the plurality of zones within the RIB, the FIB, and the forwarding tables to determine whether the routing objects in each of the RIB, the FIB, and the forwarding tables are consistent with each other; and
when the RIB, the FIB, and the forwarding tables are not consistent with each other, perform an action related to at least one of RIB, the FIB, or the forwarding tables.

16. The non-transitory computer readable medium of claim 15, wherein the routing objects in each of the RIB, the FIB, and the forwarding tables are not consistent with each other when the zonal checksum for the routing objects assigned to at least one zone of the plurality of zones does not match between the RIB, the FIB, and the forwarding tables.

17. The non-transitory computer readable medium of claim 15,
wherein the instructions cause the one or more processors to, in response the marker timestamp, calculate, by each of the RPD, the control plane kernel, and the packet forwarding engines, zonal counts of the routing objects for each zone of the plurality of zones, and
wherein to perform the consistency check, the instructions cause the one or more processors to:
compare the zonal counts calculated for each zone of the plurality of zones within the RIB, the FIB, and the forwarding tables, and determine that the routing objects in each of the RIB, the FIB, and the forwarding tables are not consistent with each other when the zonal count for at least one zone of the plurality of zones does not match between the RIB, the FIB, and the forwarding tables; and
when the zonal counts do match between the RIB, the FIB, and the forwarding tables, compare the zonal checksums calculated for each zone of the plurality of zones within the RIB, the FIB, and the forwarding tables, and determine that the routing objects in each of the RIB, the FIB, and the forwarding tables are not consistent with each other when the zonal checksum for the routing objects assigned to at least one zone of the plurality of zones does not match between the RIB, the FIB, and the forwarding tables.

18. The non-transitory computer readable medium of claim 15, wherein to perform the action, the instructions cause the one or more processors to:
send, by the collector daemon, a message to the RPD indicating that an inconsistency is found;
when the consistency check has not been repeated using the same marker timestamp a threshold number of times, initiate, by the RPD, a repeat of the consistency check by reissuing the marker timestamp; and
when the consistency check has been repeated using the same marker timestamp the threshold number of times:
generate, by the RPD, a brute force marker, in response to the brute force marker, calculate, by each of the RPD, the control plane kernel, and the packet forwarding engines, the zonal checksums, and provide values representative of each of the routing objects in the RIB, the FIB and, the forwarding tables respectively to the collector daemon, and determine, by the collector daemon, which of the routing objects are inconsistent between the RIB, the FIB, and the forwarding tables based on the values representative of each of the routing objects.

* * * * *